May 23, 1939.  C. BREER  2,159,316
MOTOR VEHICLE POWER TRANSMISSION
Original Filed Feb. 21, 1934
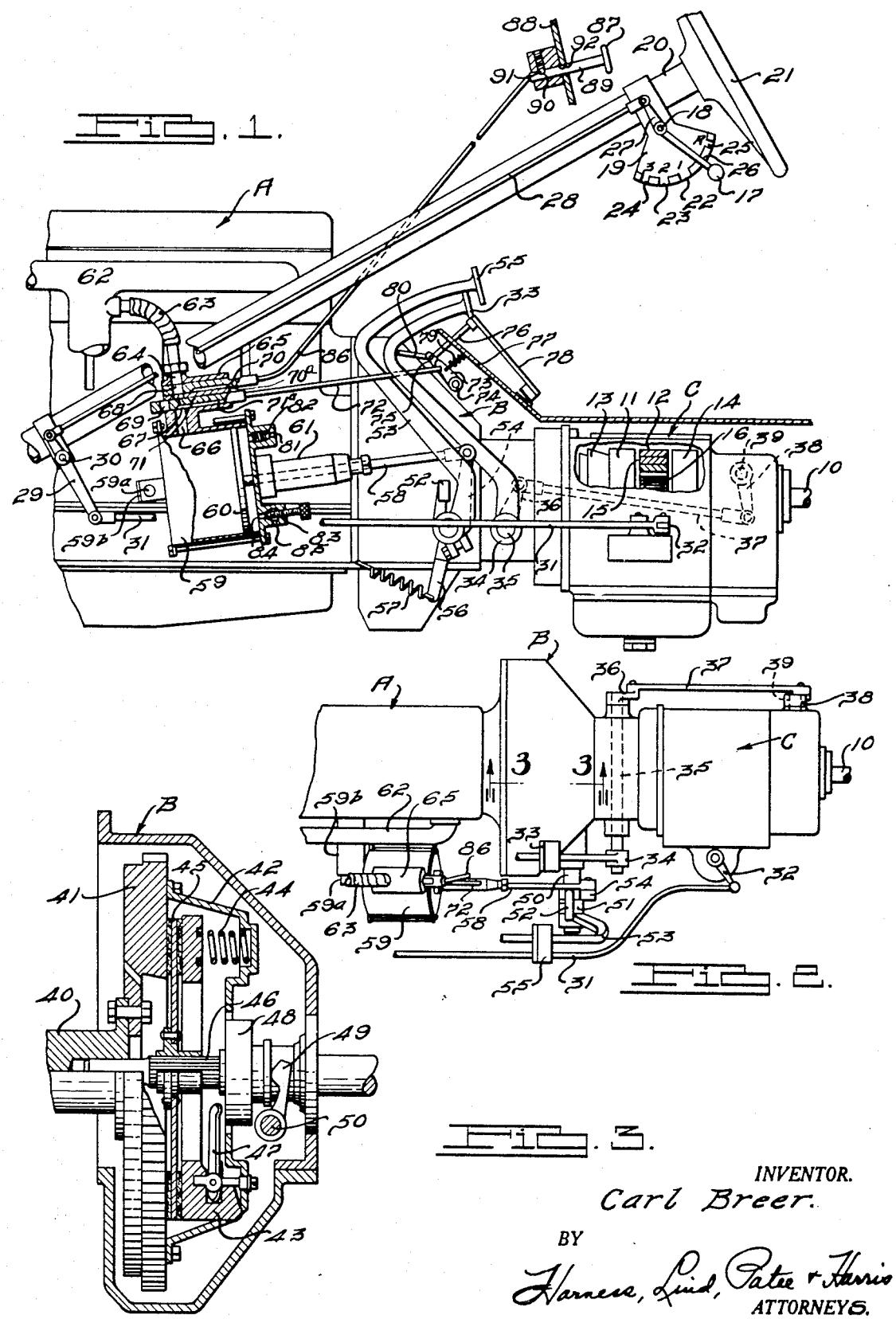
INVENTOR.
Carl Breer.
BY
Harness, Lind, Patee + Harris
ATTORNEYS.

Patented May 23, 1939

2,159,316

UNITED STATES PATENT OFFICE 2,159,316

MOTOR VEHICLE POWER TRANSMISSION

Carl Breer, Grosse Pointe Park, Mich., assignor to Chrysler Corporation, Highland Park, Mich., a corporation of Delaware Continuation of application Serial No. 712,352, February 21, 1934. This application February 28, 1935, Serial No. 8,625

6 Claims. (Cl. 192—.01)

This invention relates to motor vehicles and refers more particularly to improvements in the transmission of power from the engine to the driving wheels of the vehicle.

This application is a continuation for my co-pending application Serial No. 712,352 filed February 21, 1934.

It is desirable in connection with the drive for motor vehicles to provide a speed ratio changing transmission for varying the driving ratio between the engine and vehicle driving wheels and my invention is particularly related to motor vehicles having speed ratio changing transmissions of the planetary or epicyclic gear type. It is customary in planetary gear transmissions to provide a plurality of planetary gear trains or sets, each planetary gear train having a drum or other element associated therewith for controlling the gear train. These drums are usually rotated by the respective planetary gear trains when they are not operating to transmit the drive through the transmission and each drum has a braking device associated therewith and adapted to hold the drum stationary in order to transmit the drive through the respective planetary gear trains. A manually operated selector controlling device is provided for causing selective operation of the various planetary gear sets in order to vary the driving speed ratio through the planetary transmission.

In general a planetary type of transmission presents a number of advantages over the more conventional sliding gear types of transmissions. For example, the planetary transmission permits gear changes without the necessity of releasing the main clutch between the engine and transmission so as to obtain relatively quick gear changes and faster acceleration of the motor vehicle. This is made possible by reason of the fact that the braking devices associated with the respective planetary gear trains are in effect clutches in that each rotary drum controlling a planetary gear train is frictionally engaged by its associated braking means. The aforesaid faster acceleration between the gear changes of a planetary transmission may also be further brought about by reason of the motor speeding up between the gear changes where the engine throttle is not moved toward its closing position.

The planetary type of transmission has the further advantage of not requiring a free wheeling clutch in order to obtain smooth and otherwise satisfactory gear shifting characteristics and synchronizing devices customarily used on more conventional types of transmissions may also be dispensed with. The planetary type of transmission provides gear sets which are quiet at all speeds and which operate at a higher efficiency than the more conventional countershaft types of sliding gear transmissions. Furthermore, it is possible with a planetary gear transmission to manipulate the transmission into reverse on driving the vehicle down a hill so as to utilize the reverse gearing as a brake, or the transmission may be manipulated into a lower gear for the same purposes.

Heretofore, it has been customary to provide a main clutch in the form of a fluid coupling for transmitting the drive from the engine to the planetary gear transmission but the fluid coupling type of clutch is open to a number of disadvantages. Thus, where a fluid coupling type of clutch is used, the engine when idling drives the transmission driving shaft through the fluid medium of the clutch and where the planetary transmission is left in gear, the vehicle will tend to be slowly driven and can only be held still when on a level roadway by manipulating the transmission to the neutral setting or by maintaining the vehicle wheel brakes in the applied or braking position. This requirement for shifting the transmission to neutral occasions a loss in time in getting the vehicle started inasmuch as a further manipulation of the transmission is required.

A further disadvantage in connection with the planetary gear transmission when employed with a fluid clutch resides in typical cold weather engine starting conditions inasmuch as a residual drag is placed on the engine by reason of the planetary gear sets which tend to prevent easy turning over of the engine through the fluid medium of the clutch. A further objection to the use of a fluid coupling resides in the fact that where it is desired to start the engine by pushing the motor vehicle, the absence of a direct connection between the ground wheels and the engine renders such starting impossible.

It is an object of my invention to provide improved means for transmitting the power from the engine to a transmission of the planetary gear type whereby the aforesaid advantages of the planetary gear transmission may be retained, enlarged upon, and realized to a greater degree, and at the same time to overcome the aforesaid difficulties incident to the use of a clutch of the fluid coupling type. A further object of my invention resides in the provision of improved clutching means for controlling the drive from the engine to a planetary gear transmission wherein the clutch will be automatically disengaged when the engine is idling so as to thereby remove the aforesaid drag of the engine of the transmission when the vehicle is standing still.

In carrying out the objects of my invention, I preferably provide a clutching means which is automaticaly responsive in its actuation to the operation of the engine, the clutch being power operated, for example, by the vacuum which is produced by the engine intake system. I am thus enabled to utilize a friction type of clutching means although other types of clutching means may be utilized within keeping of the objects of my invention.

Still further objects of my invention reside in the provision of improved clutching means for transmitting the power from the engine to the planetary gear transmission whereby the motor vehicle can be brought to a complete standing-still position, the engine being free from the transmission and when desired the transmission may be left with one of its planetary gear sets in its operating condition. Thus, it is not necessary to manipulate the transmission into the neutral setting when the motor vehicle is brought to a stop and since under such conditions one of the planetary gear sets may be left in its operating condition, the motor vehicle may be quickly started. Furthermore, by reason of my invention, the engine is automatically disconnected from the planetary gear transmission thereby facilitating engine starting particularly in cold weather.

A still further object of my invention resides in the provision of improved clutching means for controlling the drive from the engine to the planetary gear transmission wherein a direct connection between the engine and driving ground wheels of the motor vehicle is possible through the intermediary of the transmission so that the engine can be started by pushing or towing the motor vehicle thereby eliminating one of the aforesaid difficulties incident to the use of a fluid coupling type of clutch.

My power transmission system is also of advantage in that it occupies a relatively small space providing additional leg room for the occupants of the motor vehicle and is generally more desirable and less expensive as a matter of manufacture.

Further objects and advantages of my invention will be apparent from the following detailed description of one embodiment thereof, reference being had to the accompanying drawing, in which:

Fig. 1 is a sectional elevational view showing my power driving mechanism, a portion of the casing of the planetary gear transmission being broken away to illustrate the speed ratio controlling devices.

Fig. 2 is a plan view of the driving mechanism illustrated in Fig. 1.

Fig. 3 is a sectional elevational view of the main clutch, the section being taken along the line 3—3 of Fig. 2.

Referring to the drawing, reference character A represents the prime mover which may be in the form of the well-known internal combustion engine, B representing the main clutch receiving the drive from the engine, and C is the speed ratio controlling transmission having a power take-off shaft 10 which transmits the drive to the usual rear vehicle ground wheels (not shown).

The transmission C is preferably of the planetary type and has the usual well-known gear ratio speed controlling braking devices 11, 12, 13 and 14 which are respectively adapted to control the first speed, second speed, direct or third speed, and reverse. In Fig. 1 I have diagrammatically illustrated the braking device 12 associated with the rotary drum 15 operated by the planetary gear train 16, it being understood that the other braking devices for the various speed ratios may be similarly arranged in a manner well known in the art.

In order to selectively control the actuation of the various speed ratio controlling devices, I have illustrated a manually operable selector arm 17 pivoted at 18 in association with the selector segment 19 conveniently mounted on the steering post 20 of the usual vehicle steering wheel 21. The segment 19 has a plurality of notches adapted to receive the arm 17, these notches being designated at 22, 23, 24, 25 and 26 respectively adapted to manipulate or set the transmission for the first speed gear ratio, second speed, third speed, reverse or neutral. In Fig. 1 the arm 17 is illustrated in the neutral position, it being understood that in such position the various rotary drums corresponding to the drum 15, are freely rotatable so as not to transmit the drive through the transmission to the shaft 10. The arm 17 actuates a lever 27, the latter being pivotaly connected through a link 28 to actuate a lever 29 pivoted at 30 intermediate the ends thereof. The lever 29 in turn transmits the movement through a link 31 to the lever 32 which extends into the usual transmission selector mechanism for causing operation of the various speed ratio controlling devices aforesaid. The arrangement illustrated is of the preselector type whereby the arm 17 may be manipulated to set the transmission for the desired speed ratio, the release of any braking device previously engaged and the subsequent engagement of another of the braking devices being dependent on actuation of a transmission control pedal 33. This pedal is pivotally mounted at 34 to a rocking shaft 35 herein illustrated as extending through the transmission housing to the other side of the transmission from that illustrated in Fig. 1. Referring particularly to Fig. 2 it will be noted that this shaft 35 carries a lever 36 connected through a link 37 to the actuating lever 38, the latter actuating a shaft 39 which extends into the transmission for causing actuation of any of the various speed ratio controlling devices according to the setting thereof determined by the aforesaid adjustment of the selector arm 17.

In operation of the planetary transmission C as thus far described, the operator adjusts the selector arm 17 to one of the notches of the selector segment 19 according to the desired speed ratio setting. The operator then depresses the pedal 33 to release any braking device of the transmission which was previously in operation and on release of the pedal 33 a further transmission controlling device will be actuated according to the aforesaid setting of the selector arm 17.

Referring now to the main clutch B which is best illustrated in Fig. 3, the drive to the clutch is provided by the engine driving shaft 40 and flywheel 41 connected thereto. The flywheel 41 carries a driving housing 42 adapted to drive a pressure plate 43, the latter being normally urged toward the flywheel by a plurality of circumferentially spaced springs 44 to apply pressure to the driven friction disc member 45 between the pressure plate and flywheel. The driven disc is drivingly connected to a driven shaft 46 which extends rearwardly into transmission C for operating the various planetary gear sets 16 previously referred to.

In order to release the clutch B, the pressure plate 43 is provided with a series of releasing levers one of which is illustrated at 47, the inner ends of the levers being engageable with a releasing collar 48, the latter being splined on driven shaft 46. The collar 48 is movable forwardly to actuate levers 47 by a releasing lever 49 carried by a shaft 50 illustrated in Fig. 2 as projecting laterally from the clutch housing. The shaft 50 has a collar 51 secured thereto, the latter having an actuating bar 52 best shown in Fig. 1, this bar being selectively operable by either of a pair of levers 53 and 54.

The lever 53 is provided with a pedal 55 at a position for convenient manipulation by the vehicle driver and preferably in close association with the aforesaid pedal 33. Thus, the vehicle driver can release the clutch B by depressing the clutch pedal 55 with his foot, the drive between the engine A and the transmission C being thereby interrupted.

The collar 51 may be provided with a downwardly extending lever 56 connected to a spring 57 to yieldingly urge the shaft 50 to the position illustrated in Fig. 3. The aforesaid lever 54 is connected to a suitable power actuating device preferably responsive in its actuation to operation of the engine, the illustration showing a vacuum operating mechanism adapted to release the clutch B whenever the engine throttle is closed or partially closed to produce a partial vacuum in the intake manifolding of the engine. Thus, the lever 54 is connected to a piston rod 58 which extends forwardly to the vacuum operating cylinder 59, the latter being adapted to house the piston 60 for causing actuation of the piston rod 58. The rod 58 actuated by piston 60 extends rearwardly from cylinder 59 through a guide 61 projecting rearwardly from cylinder 59.

The engine A is illustrated as having the usual intake manifold 62 open through a flexible pipe 63 to the port 64 of the valve controlling device 65. Cylinder 59 has a port 66 adapted to communicate with port 64 by way of the port 67 in the valve device 65 and the ports 68, 69 of the slidably adjustable vacuum control valves 70, 71 respectively. Cylinder port 66 thus communicates with port 64 only when both of valves 70, 71 are positioned to align their respective ports 68, 69 with ports 64, 67 and 66. Valves 70 and 71 are respectively provided with vent passages 70ᵃ and 71ᵃ.

For the normal operation of the piston 60 by vacuum from the engine intake system, the valve 70 is left in the position illustrated in Fig. 1 although, as will be hereinafter apparent, this valve may be positioned forwardly to move valve port 68 beyond port 64 to prevent the latter from communicating with cylinder port 66.

The valve 71 controls the supply of vacuum to cylinder 59 and thus controls the operation of piston 60 and clutch B, this valve being preferably operably connected to the usual accelerator pedal so that when the pedal is released to close the usual engine throttle, the partial vacuum thus produced in the engine intake system will communicate with cylinder 59 by movement of valve 71 to register port 69 with ports 64 and 67. Thus, valve 71 is connected through a link 72 to lever 73 fixed to rockshaft 74, the latter being rocked by a second lever 75 fixed thereto and operated by link 76 extending through the usual vehicle toe-board 77 for connection to the accelerator pedal 78. A tension spring 79 tends to yieldingly urge valve 71 rearwardly to align ports 69 and 64, spring 79 also restoring pedal 78 to its released position for closing the usual engine throttle valve (not shown) by reason of a link 80 connected to lever 75.

Cylinder 59 is vented at 81 at the rear side of piston 60, a spring pressed ball check valve 82 unseating in response to forward power movement of piston 60 to quickly release clutch B while seating when piston 60 moves rearwardly to engage the clutch. In order to control the clutch engagement to provide a smooth engagement, the rearward movement of piston 60 by spring 57 is controlled by a suitable dashpot comprising, for example, an adjustable valve 83 adapted to restrict the flow of air from cylinder 60 through ports 84, 85 and thereby regulate the speed of rearward movement of piston 60. In order to accommodate the slight rocking movement of cylinder 59 as rod 58 follows the lever 54, the cylinder is pivotally supported at 59ᵃ to an engine bracket 59ᵇ. The valve 70 is controlled by a suitable linkage or Bowden wire 86 to a handle 87 associated with the vehicle dash 88. The handle 87 has a stem 89 provided with a notch 90 adapted to receive a spring pressed ball 91 when handle 87 is pulled outwardly from dash 88, this movement actuating valve 70 into the Fig. 1 position to render the vacuum cylinder 59 in operative condition. A second notch 92 is engageable with ball 91 when handle 87 is pushed inwardly to move valve 70 to cut off the vacuum supply to cylinder 59 and thereby render the latter ineffective.

When the piston 60 is moved forwardly by the partial vacuum acting between manifold 62, ports 68, 69 and 66, rearward movement of piston 60 under action of spring 57 may subsequently readily take place by a forward movement of either of the valves 70 or 71 venting cylinder 59 forwardly of piston 60 by reason of the vent passages 70ᵃ or 71ᵃ.

Assuming that the valve 70 is positioned as in Fig. 1 to establish communication between ports 64 and 66, it will be apparent that when the engine A is operating under closed throttle conditions as in idling, for example, the partial vacuum produced in the intake manifold 62 will be transmitted to cylinder 59 by rearward movement of valve 71 to cause forward movement of the piston rod 59 to release the clutch B. When the throttle valve of the engine is again opened by depressing the accelerator pedal 78, the partial vacuum is relieved in cylinder 59 by movement of valve 71 to the Fig. 1 position and the piston rod 58 moves rearwardly under the influence of springs 57 and 44 to cause smooth engagement of the clutch B under control of dashpot valve 83. It will also be noted that the clutch B is subject to control by reason of the clutch pedal 55 which is adapted to operate independently of the vacuum power operating mechanism. Furthermore, the operator can manually render the vacuum operating mechanism ineffective by the aforesaid adjustment of the handle 87. In such adjusted position the clutch B will remain engaged and will be under the control of the clutch pedal 55 for the release thereof.

From the foregoing illustrative embodiment of my invention it will be apparent that the motor vehicle can be brought to a standing condition, the vacuum controlled cylinder 59 and parts associated therewith operating to release the clutch B and disconnect the engine from the transmission C. Thus, the engine A does not exert any drag on the transmission under the aforesaid conditions, even where the transmission C has one of its speed ratio controlling devices in actuated or operating condition. The clutch pedal 55 also provides a convenient means for releasing the clutch B from engine A so that the latter can be readily started as in cold weather without experiencing any drag from the planetary gear sets of transmission C.

I desire to point out that I do not limit my invention, in the broader aspects thereof, to any particular combination and arrangement of parts such as shown and described for illustrative purposes, since various modifications will be apparent from the teachings of my invention and within the scope thereof as defined in the appended claims.

What I claim is:

1. In a motor vehicle power transmission, an engine having an intake adapted to produce a relatively low pressure during operation thereof, a planetary gear transmission, a clutch transmitting the drive from said engine to said transmission, manually operable control means, and means for utilizing said low pressure under control of said control means for actuating said clutch.

2. In a motor vehicle power transmission having a plurality of planetary gear sets having rotary controlling elements and devices frictionally and selectively engageable with said elements to vary the speed ratio drive through the transmission, an engine operated driving shaft adapted to drive the transmission, a clutch between said driving shaft and said transmission for controlling the drive therebetween, manually operable control means, and means for utilizing engine intake pressure variation under control of said control means for engaging and disengaging said clutch.

3. In a motor vehicle power transmission having a plurality of planetary gear sets having rotary controlling elements and devices adapted for frictional and selective engagement with said elements to vary the speed ratio drive through the transmission, an engine operated driving shaft adapted to drive the transmission, a clutch between said driving shaft and said transmission for controlling the drive therebetween, and means acting to automatically engage and disengage said clutch in response to manipulation of the motor vehicle engine accelerator pedal.

4. In a motor vehicle, an engine having a throttle adjusting mechanism, a planetary gear transmission having a plurality of rotary elements and associated frictionally engaging speed ratio changing devices, means for selectively actuating said devices, clutching means between said engine and said transmission, power operating means for operating said clutching means, and means actuated in response to operation of said mechanism, in adjusting the throttle to idle said engine, for controlling operation of said power means to disconnect the drive from the engine to the transmission, the last said means being so constructed and arranged as to facilitate selective frictional engagement of said devices with said rotary elements and minimize shock incident thereto in response to manipulation of said selectively actuating means during release of said throttle adjusting mechanism to disengage said clutching means.

5. In a motor vehicle, an engine having a throttle adjusting mechanism, a planetary gear transmission having a plurality of rotary elements and associated frictionally engaging speed ratio changing devices, means for selectively actuating said devices, clutching means between said engine and said transmission, power operating means for operating said clutching means, and means actuated in response to operation of said mechanism, in adjusting the throttle to idle the engine, for controlling operation of said power means to disconnect the drive from the engine to the transmission with one of said speed ratio controlling devices in its frictionally engaged condition, the last said means being so constructed and arranged as to facilitate selective frictional engagement of said devices and minimize shock incident thereto in response to manipulation of said selectively actuating means during release of said throttle adjusting mechanism to disengage said clutching means.

6. In a motor vehicle power transmission having a plurality of planetary gear sets having rotary controlling elements and devices adapted for frictional and selective engagement with said elements to vary the speed ratio drive through the transmission, manually operable selector means adapted for manipulation to selectively engage said devices with said rotary controlling elements, an engine having a throttle adjusting mechanism, an engine operated driving shaft adapted to drive the transmission, a clutch between said driving shaft and said transmission for controlling the drive therebetween, and means acting to automatically engage and disengage said clutch in response to predetermined operation of said throttle adjusting mechanism during operation of the engine, the last said means being so constructed and arranged as to facilitate selective engagement of said devices with said rotary controlling elements and minimize shock incident thereto in response to manipulation of said manually operable selector means during release of said throttle adjusting mechanism to disengage said clutch.

CARL BREER.